(12) United States Patent
Yang et al.

(10) Patent No.: US 11,283,173 B2
(45) Date of Patent: *Mar. 22, 2022

(54) THIN CHASSIS NEAR FIELD COMMUNICATION (NFC) ANTENNA INTEGRATION

(71) Applicant: Intel Corporation, Santa Clara, CA (US)

(72) Inventors: Songnan Yang, San Jose, CA (US); Hao-Han Hsu, Portland, OR (US); Ulun Karacaoglu, San Diego, CA (US); Anand Konanur, Sunnyvale, CA (US); Yee Wei Eric Hong, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/993,387

(22) Filed: Aug. 14, 2020

(65) Prior Publication Data

US 2021/0066803 A1    Mar. 4, 2021

Related U.S. Application Data

(63) Continuation of application No. 15/607,378, filed on May 26, 2017, now Pat. No. 10,749,261, which is a
(Continued)

(51) Int. Cl.
*H04B 5/00*    (2006.01)
*H01Q 7/00*    (2006.01)
(Continued)

(52) U.S. Cl.
CPC .............. *H01Q 7/00* (2013.01); *H01Q 1/22* (2013.01); *H01Q 1/2216* (2013.01);
(Continued)

(58) Field of Classification Search
None
See application file for complete search history.

(56) References Cited

U.S. PATENT DOCUMENTS 6,342,864 B1    1/2002    Muramoto et al.
6,546,107 B1    4/2003    Bohnke
(Continued)

FOREIGN PATENT DOCUMENTS

WO    2014/004282 A1    1/2014

OTHER PUBLICATIONS

Non-Final Office Action received for U.S. Appl. No. 14/931,769, dated May 20, 2016, 11 pages.
(Continued)

*Primary Examiner* — AB Salam Alkassim, Jr.
(74) *Attorney, Agent, or Firm* — Schiff Hardin LLP

(57) ABSTRACT

Described herein are techniques related one or more systems, apparatuses, methods, etc. for integrating a near field communications (NFC) coil antenna in a portable device. For example, the NFC antenna is integrated under a metal chassis of the portable device. The metal chassis and a conductive coating—that is integrated underneath the full metal chassis—are designed to include one or more slots to provide high impedance to Eddy current induced in the conductive coating.

20 Claims, 7 Drawing Sheets

Related U.S. Application Data continuation of application No. 14/942,877, filed on Nov. 16, 2015, now abandoned, which is a continuation of application No. 14/931,769, filed on Nov. 3, 2015, now Pat. No. 9,614,592, which is a continuation of application No. 14/797,608, filed on Jul. 13, 2015, now Pat. No. 9,685,995, which is a continuation of application No. 13/536,733, filed on Jun. 28, 2012, now Pat. No. 9,083,073.

(51) Int. Cl.
    *H01Q 1/22* (2006.01)
    *H04W 4/80* (2018.01)
    *H01Q 1/44* (2006.01)
    *H01Q 1/24* (2006.01)

(52) U.S. Cl.
    CPC .......... *H01Q 1/2266* (2013.01); *H01Q 1/243* (2013.01); *H01Q 1/44* (2013.01); *H04B 5/0081* (2013.01); *H04W 4/80* (2018.02)

(56) References Cited

U.S. PATENT DOCUMENTS

| | | | |
|---|---|---|---|
| 6,680,712 B2 | 1/2004 | Yamamoto et al. | |
| 6,879,293 B2 | 4/2005 | Sato | |
| 7,738,494 B2 | 6/2010 | Takayama | |
| 8,905,317 B1 | 12/2014 | Hsu et al. | |
| 9,000,619 B2 | 4/2015 | Kato et al. | |
| 9,083,073 B2 * | 7/2015 | Yang | H01Q 1/243 |
| 9,397,727 B1 | 7/2016 | Mattsson et al. | |
| 9,608,327 B1 | 3/2017 | Tai et al. | |
| 9,614,592 B2 * | 4/2017 | Yang | H01Q 1/2216 |
| 9,685,995 B2 | 6/2017 | Yang et al. | |
| 9,756,155 B2 | 9/2017 | Ettel et al. | |
| 9,853,695 B2 | 12/2017 | Konanur et al. | |
| 10,186,753 B2 | 1/2019 | Asou et al. | |
| 10,290,934 B2 | 5/2019 | Tomonari et al. | |
| 10,749,261 B2 * | 8/2020 | Yang | H01Q 7/00 |
| 2008/0149736 A1 | 6/2008 | Kim et al. | |
| 2009/0096694 A1 | 4/2009 | Ito et al. | |
| 2009/0153412 A1 * | 6/2009 | Chiang | H01Q 15/006 343/702 |
| 2009/0201116 A1 | 8/2009 | Orihara | |
| 2009/0278757 A1 | 11/2009 | Ahn et al. | |
| 2009/0315788 A1 | 12/2009 | Hirota | |
| 2010/0090914 A1 | 4/2010 | Watanabe | |
| 2010/0123010 A1 | 5/2010 | Sakama | |
| 2010/0264211 A1 | 10/2010 | Jain et al. | |
| 2010/0309088 A1 | 12/2010 | Hyvonen et al. | |
| 2010/0321255 A1 | 12/2010 | Kough et al. | |
| 2012/0038443 A1 | 2/2012 | Kubo et al. | |
| 2012/0057322 A1 | 3/2012 | Waffenschmidt | |
| 2012/0071088 A1 | 3/2012 | Cordier | |
| 2012/0071090 A1 | 3/2012 | Charrat et al. | |
| 2012/0091821 A1 * | 4/2012 | Kato | G06K 19/07779 307/104 |
| 2012/0242159 A1 | 9/2012 | Lou et al. | |
| 2012/0268343 A1 | 10/2012 | Yanagi et al. | |
| 2012/0276854 A1 | 11/2012 | Joshi et al. | |
| 2012/0306714 A1 | 12/2012 | Yosui et al. | |
| 2013/0050035 A1 | 2/2013 | Kato et al. | |
| 2013/0050045 A1 * | 2/2013 | Chacinski | H01Q 7/00 343/848 |
| 2013/0335284 A1 | 12/2013 | Hsu et al. | |
| 2014/0015724 A1 | 1/2014 | Bungo | |
| 2014/0080411 A1 | 3/2014 | Konanur et al. | |
| 2014/0092543 A1 | 4/2014 | Yang et al. | |
| 2014/0111387 A1 | 4/2014 | Konanur et al. | |
| 2014/0198006 A1 | 7/2014 | Nakano | |
| 2015/0053773 A1 | 2/2015 | Hsu et al. | |
| 2015/0207223 A1 | 7/2015 | Nakano | |
| 2015/0380827 A1 | 12/2015 | Tahtinen | |
| 2016/0073221 A1 | 3/2016 | Yang et al. | |
| 2016/0148752 A1 | 5/2016 | Moon et al. | |
| 2016/0315373 A1 | 10/2016 | Azad et al. | |
| 2017/0077597 A1 | 3/2017 | Gong et al. | |

OTHER PUBLICATIONS

Final Office Action received for U.S. Appl. No. 13/536,733 dated Sep. 11, 2014, 9 Pages.

Notice of Allowance received for U.S. Appl. No. 13/536,733, dated Mar. 11, 2015, 5 Pages.

Non-Final Office Action received for U.S. Appl. No. 13/536,733, dated Apr. 24, 2014, 10 pages.

Supplemental Notice of Allowance received for U.S. Appl. No. 13/536,733, dated Apr. 22, 2015, 3 pages.

International Preliminary Report on Patentability and Written Opinion received for PCT Patent Application No. PCT/US2013/046997, dated Jan. 8, 2015, 8 pages.

International Search Report and Written Opinion received for PCT Patent Application No. PCT/US2013/046997, dated Oct. 9, 2013, 13 pages.

* cited by examiner

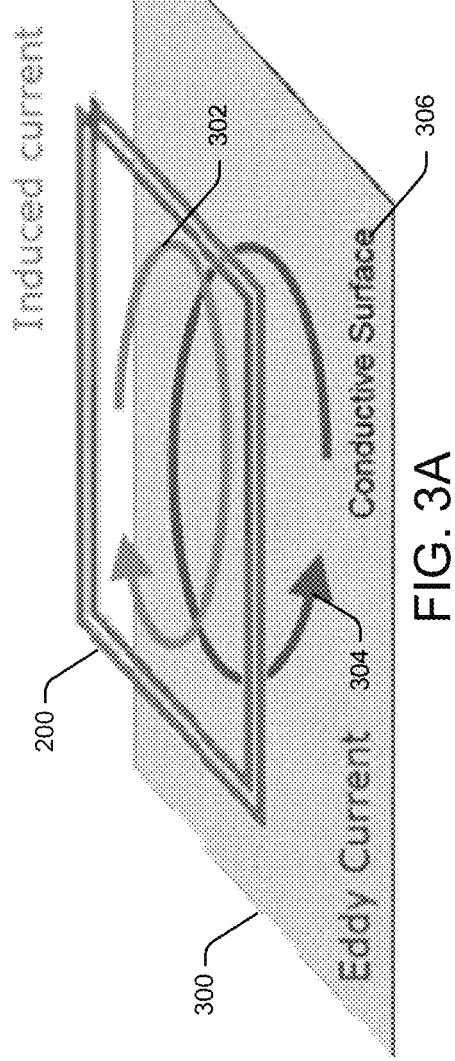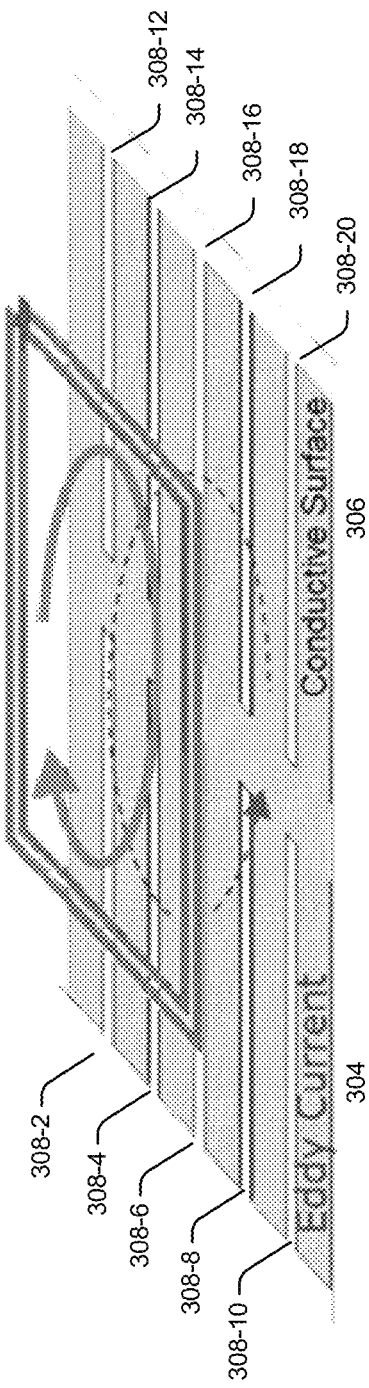
FIG. 3A (PRIOR ART)
FIG. 3B

THIN CHASSIS NEAR FIELD COMMUNICATION (NFC) ANTENNA INTEGRATION

BACKGROUND

Recently, technologies have arisen that allow near field coupling (e.g., wireless power transfers (WPT) and near field communications (NFC)) between portable devices in close proximity to each other. Such near field coupling functions may use radio frequency (RF) antennas in the devices to transmit and receive electromagnetic signals. Because of user desires (and/or for esthetic reasons) many of these portable devices are small (and becoming smaller), and tend to have exaggerated aspect ratios when viewed from the side. As a result, many of these portable devices incorporate flat antennas, which use coils of conductive material as their radiating antennas for use in near field coupling functions.

For example, an NFC antenna integration in a plastic chassis portable device may be achieved by creating a cutout on a conductive electromagnetic interference (EMI) coating under a palm rest area of the portable device, such that the NFC antenna that is attached to the cutout area may radiate through the chassis effectively. For devices having a complete metallic chassis, the metallic chassis is often used to maintain mechanical strength in a thin design. The use of the metallic chassis creates a key challenge for NFC coil antenna integration into such devices (e.g., thin laptop computer such as Ultrabooks), since the NFC antenna needs a non-metallic surface in order to radiate through.

BRIEF DESCRIPTION OF THE DRAWINGS

FIG. 3A illustrates an example underneath view of a coil antenna and a conductive surface of a conductive coating.

FIG. 3B illustrates an example upside down view of a coil antenna and a conductive coating with one or more slots.

The following Detailed Description is provided with reference to the accompanying figures. In the figures, the left-most digit(s) of a reference number usually identifies the figure in which the reference number first appears. The use of the same reference numbers in different figures indicates similar or identical items.

DETAILED DESCRIPTION

This document discloses one or more systems, apparatuses, methods, etc. for integrating a near field communications (NFC) coil antenna in a portable device such as, in a palm rest of a full metal chassis portable device (e.g., Ultrabook). In an implementation, the NFC coil antenna may include continuous multiple loops to form a ring shaped antenna (e.g., rectangular shape). In this implementation, the NFC coil antenna may be directly integrated underneath the full metal chassis of the portable device. For example, the full metal chassis may be configured to utilize a special pattern or design to reduce Eddy currents that may be induced by electromagnetic fields radiated by the NFC coil antenna. In this example, the special pattern or design may include construction of one or more slots in the full metal chassis such that the one or more slots may include segments or slices that extend from the full metal chassis to a conductive coating which is embedded or attached to the full metal chassis. In an implementation, the one or more slots are configured to be perpendicular to an assumed direction of the Eddy current. For example, if the Eddy current is calculated to have a curvature direction, then the one or more slots may be configured to adopt and follow the curvature direction of the Eddy current to maintain the perpendicular configuration. The perpendicular configuration of the one or more slots may provide high impedance to the Eddy current. As such, the conductive coating is transformed into a transparent conductive coating as a result of the minimized presence of the Eddy current. Furthermore, an area in the conductive coating that is defined by the one or more slots may contain one or more grounding points to maintain electrostatic discharge (ESD) protection. For example, if the area covered by the one or more slots is rectangular in shape, then the one or more grounding points may be located in a middle of at least one side of the rectangular shape area.

Figure 1:
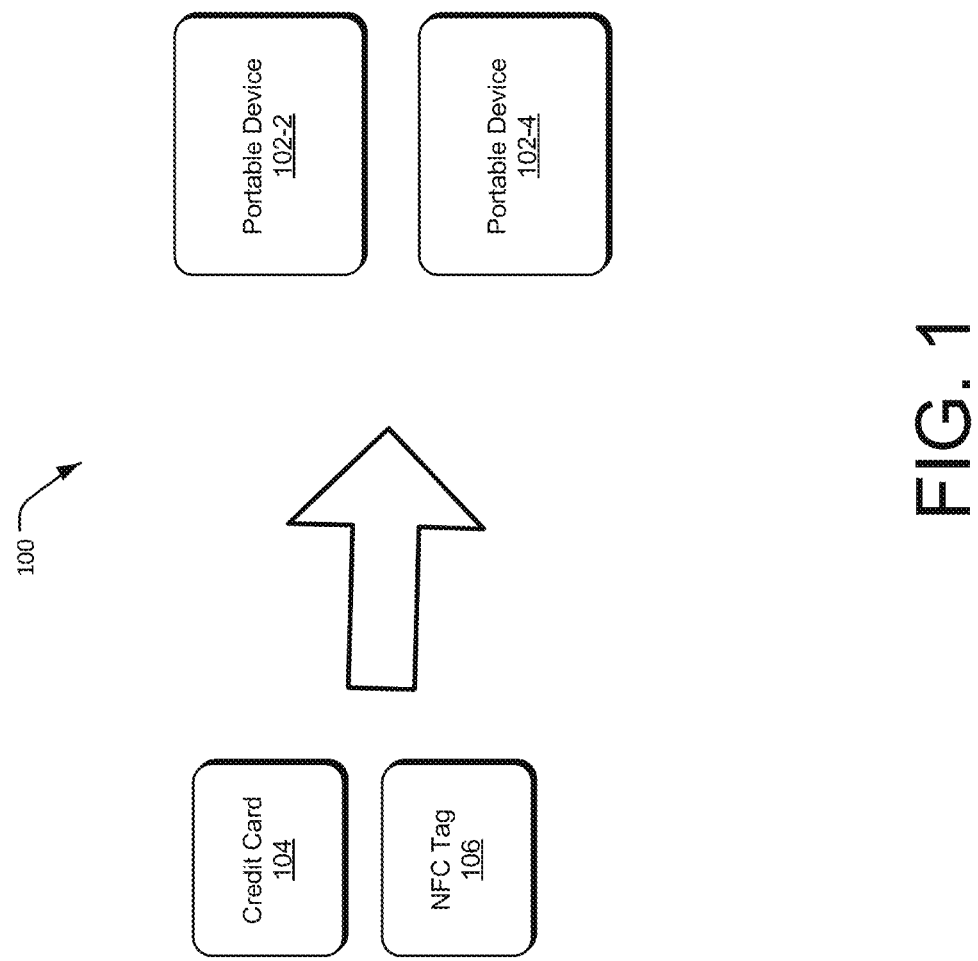
FIG. 1 illustrates portable devices in an example near field coupling arrangement.

FIG. 1 illustrates an example arrangement 100 of portable devices for near field coupling. More particularly, users may have a desire to operate near field coupling enabled portable electronic devices and/or other devices in certain ergonomically convenient manners. Examples of such portable devices include, but are not limited to, ultrabooks, a tablet computer, a netbook, a notebook computer, a laptop computer, mobile phone, a cellular phone, a smartphone, a personal digital assistant, a multimedia playback device, a digital music player, a digital video player, a navigational device, a digital camera, and the like.

In an implementation, FIG. 1 shows two users (not shown) that operate their NFC-enabled portable devices 102-2 and 102-4 to perform NFC-related information sharing functions. For example, a front-to-back (not shown), or a back-to-back (not shown) manner may be performed for the NFC communication. In an implementation, the portable devices 102 may accept information from a credit card 104, a NFC tag 106 (or other similar device) through a NFC coil antenna (not shown). The portable devices 102 may require the NFC coil antenna (not shown) to be integrated in a palm rest (not shown) or in other areas of the portable devices 102. For example, the NFC coil antenna (not shown) may be integrated underneath a metal chassis of portable device 102, or the NFC coil antenna (not shown) may be integrated underneath conductive coating of the portable device 102. In this example, the portable devices 102 may accept information from a credit card 104 or NFC tag 106 through the NFC coil antenna (not shown).

Figure 2A:
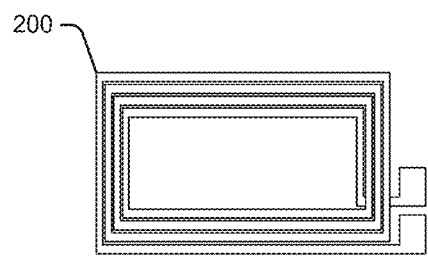
FIGS. 2A and 2B illustrate an example near field communications (NFC) coil antenna and top view of a keypad area in a portable device, respectively.

FIG. 2A illustrates an example NFC coil antenna 200. In an implementation, the coil antenna 200 may include a continuous multiple loop of coil antenna that forms a rectangular ring shape. The continuous loop of coil antenna 200 may be mounted on, embedded in, or otherwise associated with a metallic chassis (not shown) or a conductive coating of a plastic chassis device, such as portable device 102. The coil antenna 200 may include a dedicated antenna for NFC purposes. In other words, the coil antenna 200 may be configured to operate on a separate resonant frequency (e.g., 13.56 MHz to implement NFC operations), and independent from another antenna that uses standard frequencies used in wireless communications (e.g., 5 GHz for WiFi signals). The coil antenna 200 may be made out of a printed circuit board (PCB), a flexible printed circuit (FPC), a metal wire, created through a laser direct structuring (LDS) process, or directly embedded to the metallic chassis (not shown) and underneath a conductive coating (not shown) portable device 102.

Figure 2B:
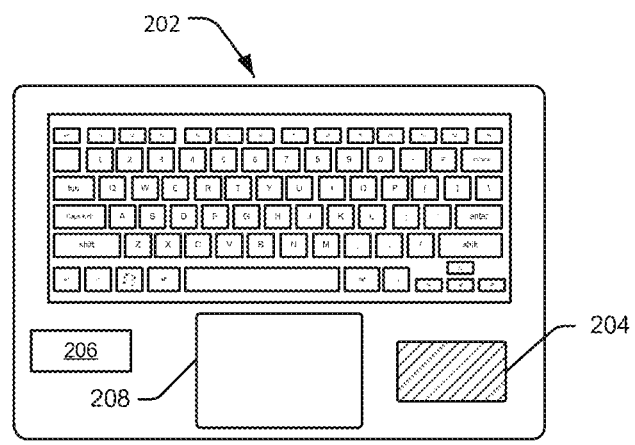

FIG. 2B illustrates a top view of a keypad area 202 of the portable device 102. In an implementation, the present embodiment may include a unique pattern and design of the conductive coating (not shown) that is associated with or located underneath chassis 204. In this implementation, the conductive coating (not shown) may be associated with chassis 204. Chassis 204 may be plastic or full metal. For example, in a full metallic chassis, the unique pattern and design may be implemented to extend from the conductive coating (not shown) of chassis 204. In a full metallic chassis 204, the unique pattern and design may be implemented by providing slots in the metallic chassis 204. For plastic chassis 204, the unique pattern and design may extend to the conductive coating (not shown) alone. In an implementation, the unique pattern and design may include construction of one or more slots (not shown) in the chassis 204 to allow the coil antenna 200 to perform NFC related functions.

In an implementation, an NFC module 206 may be integrated anywhere inside the keypad area 202 or in other areas such us, beside a trackpad area 208. The NFC module 206 may include transceiver circuitry that processes electrical signals in the coil antenna 200. For example, the NFC module 206 may be used to provide tuning to the coil antenna 200 for maximum power transfer during transmit or receive operations. In other implementations, the NFC module 206 may be integrated with the coil antenna 200 underneath the chassis 204 to form a single module.

FIGS. 3A and 3B illustrate an underneath view of the coil antenna 200 integration in the chassis 204. For example, the coil antenna 200 is placed underneath the full metal chassis 204 that includes an integrated or associated conductive coating 300. In this example, the integrated or associated conductive coating 300 is located between the coil antenna 200 and the chassis 204. FIG. 3A and FIG. 3B shows the underneath of this configuration (i.e., chassis 204 at bottom and coil antenna 200 at top).

With continuing reference to FIG. 3A which may be prior art configuration, when a current 302 is injected through the coil antenna 200, an electromagnetic field (not shown) may be generated around the coil antenna 200. In an implementation, the electromagnetic field (not shown) may induce an Eddy current 304 in a conductive surface 306 of the conductive coating 300. In this implementation, the Eddy current 304 is flowing in opposite direction as against the direction of the injected current 302. As a result, the Eddy current 304 may generate a reactive magnetic field (not shown) that may partially cancel the electromagnetic field (not shown) generated by the coil antenna 200. To this end, the NFC performance of the coil antenna 200 is significantly impacted. In other words, such as in a full metal chassis 204, impedance (not shown) seen by the Eddy current 304 is approximately zero, and thus the induced Eddy current 304 magnitude is high. The higher the Eddy current 304, the lower NFC field strength (not shown) is produced in the coil antenna 200.

With continuing reference to FIG. 3B, the special pattern or design for the conductive coating 300 may minimize presence of the Eddy current 304. For example, the special pattern or design may include construction or insertion of one or more slots 308 to reduce coupling between the coil antenna 200 and the conductive coating 300. In an implementation, the one or more slots 308 may include segments or slices that are constructed to be perpendicular in direction to the Eddy current 304. In this implementation, the perpendicular configuration of the one or more slots 308 may provide high impedance or electrical resistance to the Eddy current 304. The high impedance may reduce the Eddy current 304 and as such, the NFC field strength for the coil antenna 200 is increased.

In an implementation, such as in plastic chassis (e.g., chassis 204), the one or more slots 308 may be constructed at the conductive coating 300 alone. On the other hand, in case of full metal chassis 204, the one or more slots 308 may be constructed to extend from the full metal chassis 204 to the integrated conductive coating 300 that is located underneath the full metal chassis 204.

Figure 4:
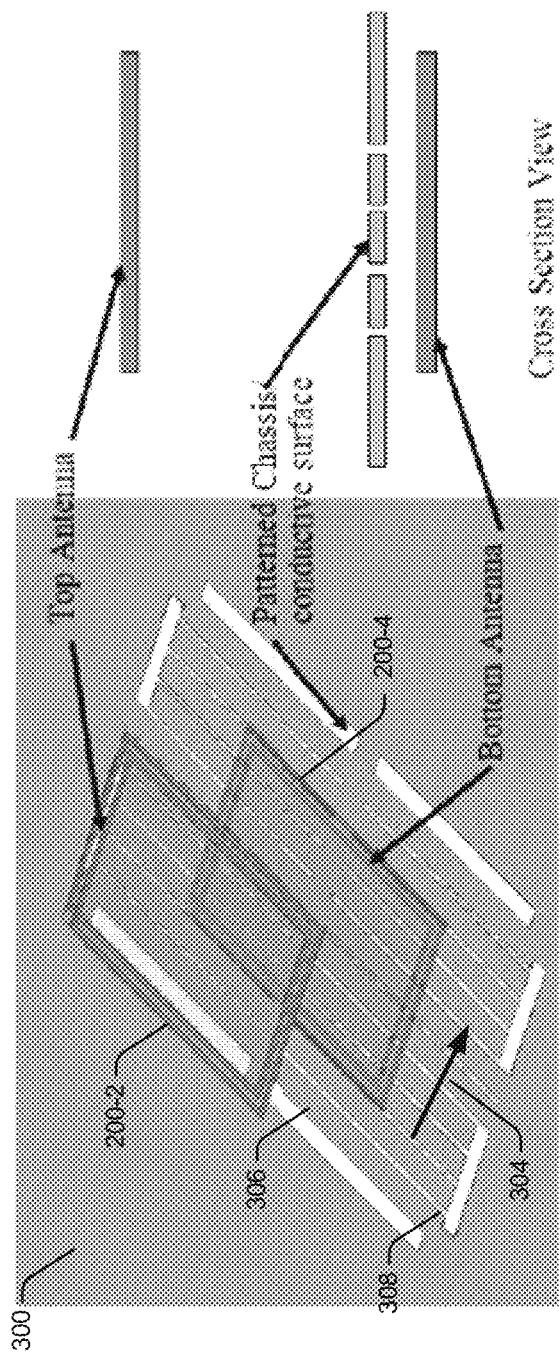
FIG. 4 illustrates an example near field communications (NFC) related operation.

FIG. 4 illustrates an example NFC related operation of the coil antenna 200. In an implementation, a coil antenna 200-2 may include the coil antenna for the credit card 104 or the NFC tag 106, while the coil antenna 200-4 may include another coil antenna for the portable device 102. In this implementation, the credit card 104 or the NFC tag 106 is read by the coil antenna 200-4 through the one or more slots 308. In an implementation, the one or more slots 308 may transform the conductive coating 300 into a transparent conductive coating 300 such that the integrated coil antenna 200-4 may perform NFC related functions as if the conductive coating 300 is not present. In other words, the conductive coating 300 may include a low coupling coefficient such that the coil antenna 200-4 may be able to read the credit card 104 or the NFC tag 106 without compromising ESD protection for the conductive coating 300.

Figure 5:
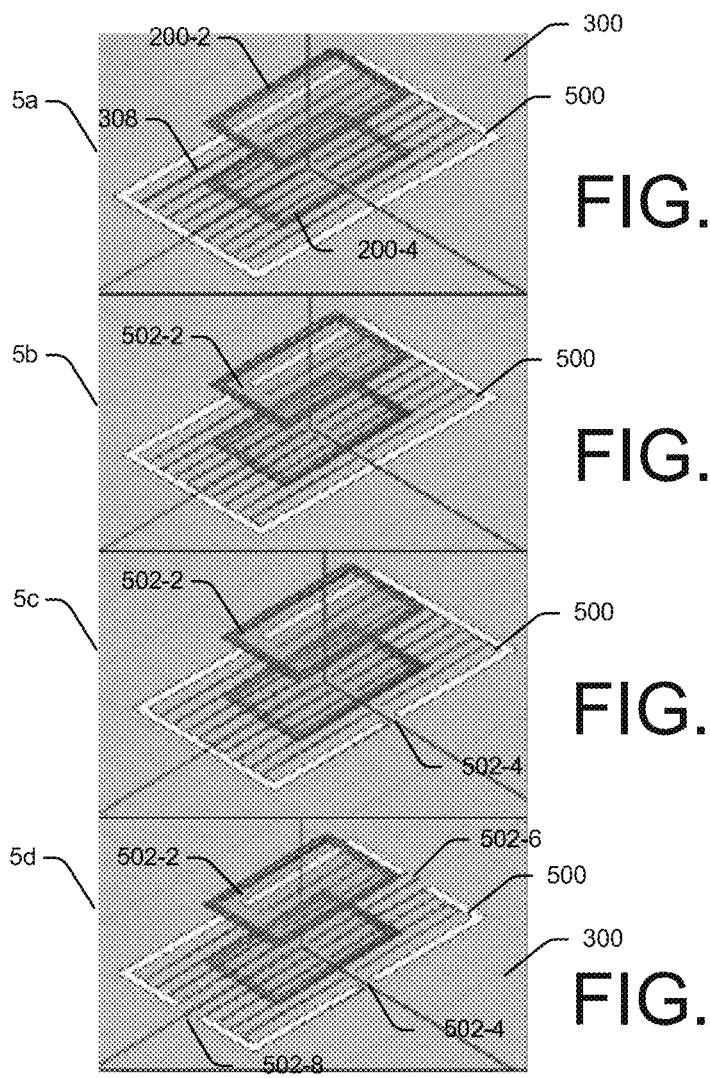
FIGS. 5A to 5D illustrate example locations for one or more grounding points to provide electrostatic discharge (ESD) protection.

FIG. 5A and FIG. 5B illustrate an example locations for grounding points in the slots 308. In an implementation, the one or more slots 308 may be constructed within an area defined by area 500 (of the conductive coating 300). In this implementation, the area 500 may be defined at least by extent of the electromagnetic field (not shown) that is generated by the coil antenna 200-4 during the NFC related operations between the coil antenna 200-4 and/or coil antenna 200-2. For example, if the extent of the electromagnetic field (not shown) may include at least the area covered by the area 500, then the probable Eddy current 304 is greatly reduced because the extent of the electromagnetic field (not shown) is related to amount of the Eddy current 304 that is induced to the conductive coating 300. In this example, the area 500 may be constructed to provide maximum impedance to the induced Eddy current 304.

With continuing reference to FIG. 5A, the area 500 may include a portion of the conductive coating 300. In certain designs, the slots 308 may cover not only the conductive coating 300 but may also extend or penetrate the full metal chassis 204 for portable device 102. In an implementation, no grounding point 502 is placed or inserted in the area 500. In this implementation, a high coupling (e.g., coupling coefficient of 0.0846) may result.

With continuing reference to FIGS. 5B to 5D, one or more grounding points 502 are inserted or placed to connect the area 500 to the rest of the conductive coating 300. For example, FIG. 5B may include a grounding point 502-2 to provide ESD protection to the coil antenna 200. In this example, the grounding point 502-2 may be located in a middle of at least one side of the area 500. In an implementation, the area 500 may define a rectangular shape to adopt rectangular configuration of the coil antenna 200. In this implementation, the middle of the at least one side of the area 500 may include any of four sides that define a perimeter (i.e., outer portion) of the area 500. For example, in FIG. 5C, the grounding points 500-2 and 500-4 may be located at the middle of opposite sides of the rectangular area 500. The grounding points 500-2 and 500-4 may connect the area 500—where the slots 308 are constructed—to the rest of the conductive area 300. To this end, a lower coupling coefficient may be produced as a result.

In another example such as, in FIG. 5D, grounding points 502-6 and 502-8 may be added to the grounding points 500-2 and 500-4. In this example, the grounding points 502-2, 502-4, 502-6 and 502-8 are located at the middle of the four perimeter sides of the rectangular area 500. The presence of four grounding points 502 may decrease the coupling coefficient (e.g., coupling coefficient of 0.0731) for the coil antenna 200. In other words, the configuration illustrated in FIGS. 5B to 5D may allow integration of the coil antenna 200 to the portable device 102 without introduction of any other materials, such as a ferrite (not shown) that may be inserted between the coil antenna 200 and metallic components (not shown). Furthermore, the configuration illustrated in FIGS. 5B to 5D may allow ESD protection to pass ESD regulatory requirements.

Figure 6:
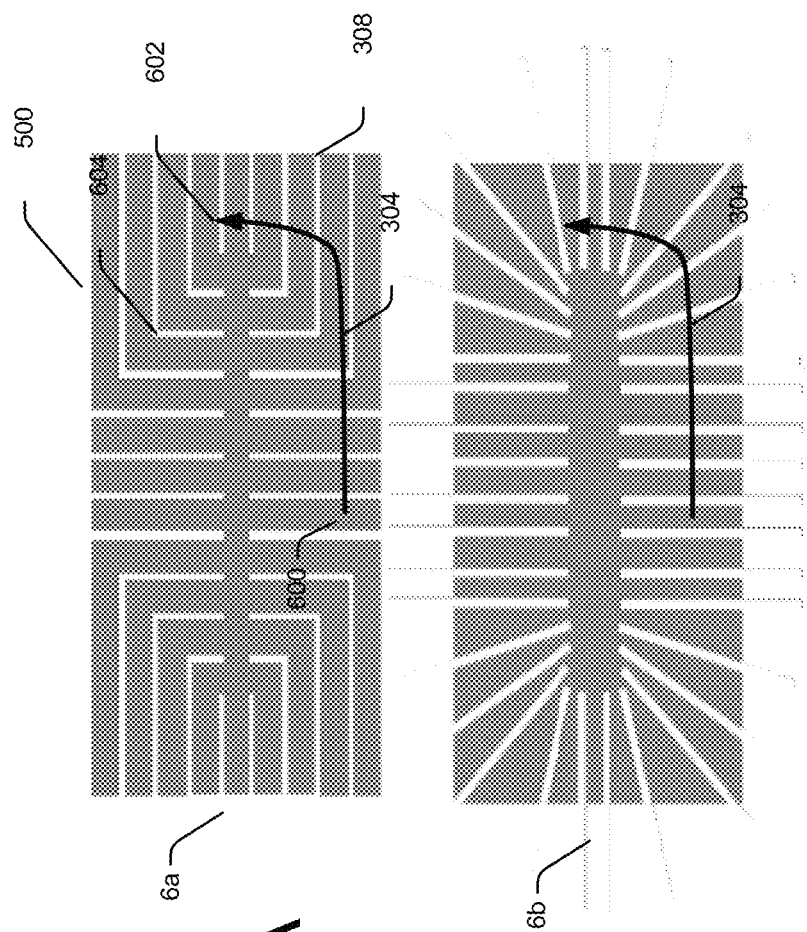
FIGS. 6A and 6B illustrate example slot configurations in a conductive coating to provide high impedance to an induced current.

FIGS. 6A and 6B illustrate example slot 308 configurations in the conductive coating 300 in order to provide high impedance to the Eddy current 304. With continuing reference to FIG. 6a, the slot 308 may be configured in such a way that the direction of each slot 308 in the area 500 is approximately perpendicular to assumed direction of the Eddy current 304. For example, when the Eddy current 304 starts at point 600, flows through a straight path and then bends in direction up to point 602, the slot 308 may be constructed to adopt and follow the straight path and curvature direction of the Eddy current 304 from the point 600 to the point 602. In this example, some of the slots 308 may be constructed to include right angles 604 to provide the perpendicular configuration of the slots 308 with regard to the assumed direction of the Eddy current 304.

With continuing reference to FIG. 6B, the slots 308 with right angles 604 as discussed in FIG. 6A, are replaced by straight slots 308. For example, the slots 308 may be configured to be perpendicular to the assumed direction of the Eddy current 304 without bending the slots 308 with right angles 604. Instead, the direction of the slots 308 may be adjusted to maintain perpendicular configuration with regard to curving direction of the Eddy current 304. In an implementation, the slots 308 may include segments or slices—of conductive coating 300—that are cut out to form the high impedance area 500.

Figure 7:
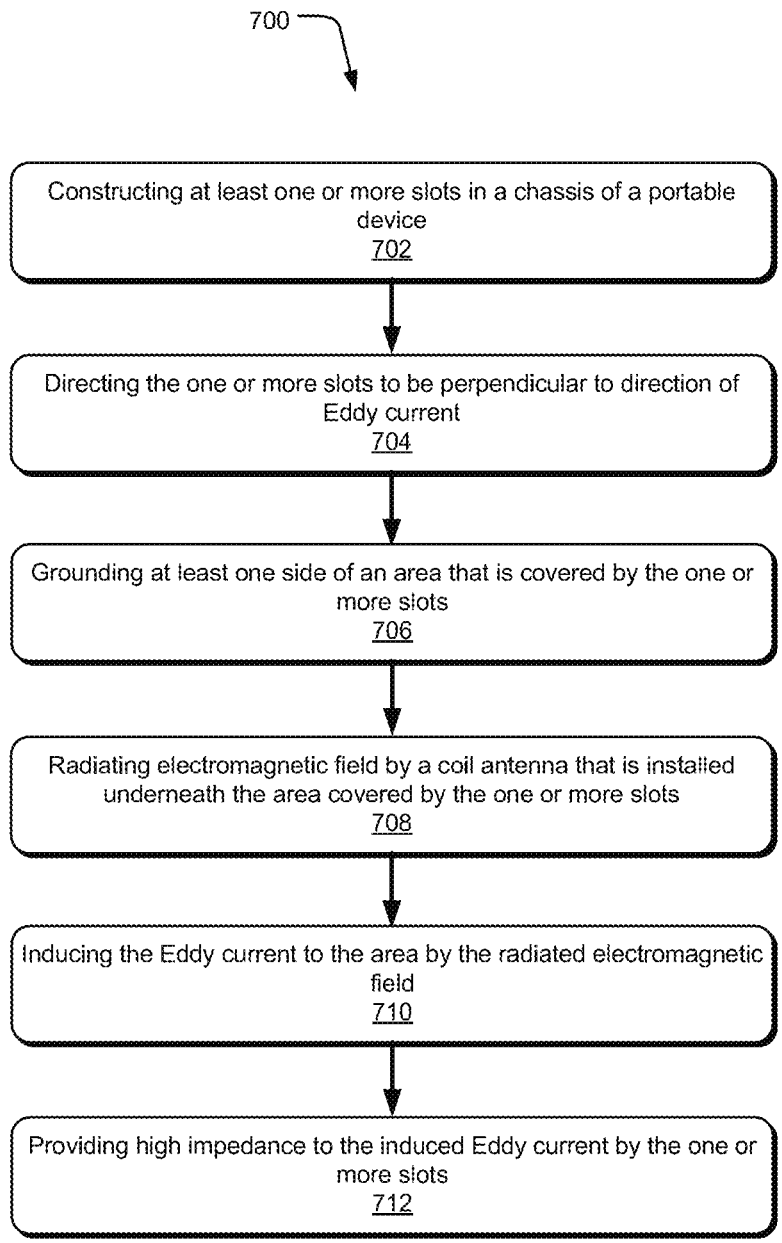
FIG. 7 is an example method to facilitate near field communications (NFC) coil antenna integration in a full metal chassis portable device.

FIG. 7 shows an example process chart 700 illustrating an example method for integrating a NFC antenna at a full metallic chassis portable device to facilitate near field communications. The order in which the method is described is not intended to be construed as a limitation, and any number of the described method blocks can be combined in any order to implement the method, or alternate method. Additionally, individual blocks may be deleted from the method without departing from the spirit and scope of the subject matter described herein. Furthermore, the method may be implemented in any suitable hardware, software, firmware, or a combination thereof, without departing from the scope of the invention.

At block 702, constructing one or more slots in a chassis is performed. In an implementation, the one or more slots (e.g., slots 308-2, 308-4, etc.) may be constructed in a conductive coating (e.g., conductive coating 300) of a plastic chassis (e.g., chassis 204) in a portable device (e.g., portable device 102). In another implementation, the one or more slots 308 may be constructed in the conductive coating 300 and extend up to full metal chassis 204 in case of Ultrabooks design. In other words, the one or more slots 308 protrude to surface of the full metal chassis 204.

At block 704, directing the one or more slots to be perpendicular with regard to direction of Eddy current is performed. In an implementation, an assumed direction of the Eddy current (e.g., Eddy current 304) may include an opposite direction to the direction of injected current in a coil antenna (e.g., coil antenna 200). For example, if the direction of the injected current in the coil antenna 200 is clockwise, then the direction of the Eddy current 304 is counter-clockwise.

At block 706, grounding at least one side of an area covered by the one or more slots is performed. In an implementation, the coil antenna 200 may include a continuous loop of coil to form a rectangular ring shaped coil antenna 200. The rectangular ring shaped coil antenna 200 may radiate electromagnetic fields sufficient to induce an Eddy current (e.g., Eddy current 304) within the area (e.g., area 500) covered by the one or more slots 308. In an implementation, at least one side of the area 500 may be grounded to provide ESD protection to the coil antenna 200.

At block 708, radiating the electromagnetic field by the coil antenna is performed. In an implementation, the coil antenna 200 may be embedded directly underneath the conductive coating 300. The conductive coating 300 may be integrated to the chassis 204 of the portable device 102. In an implementation, the coil antenna 200 may radiate the electromagnetic field during NFC related operations.

At block 710, inducing the Eddy current is performed. In an implementation, the radiated electromagnetic field may induce the Eddy current 304 to the conductive coating 300.

At block 712, providing high impedance to the induced Eddy current is performed. In an implementation, the one or more slots 308 may provide high impedance to the Eddy current 304. The high impedance may be generated by the perpendicular configuration of the one or more slots 308 to the assumed direction of the Eddy current 304.

Realizations in accordance with the present invention have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the various configurations may be implemented as a combined structure or component. These and other variations, modifications, additions, and improvements may fall within the scope of the invention as defined in the claims that follow.

The following examples pertain to further embodiments. A portable device comprising: one or more processors; a memory configured to the processors; a near field communications (NFC) antenna configured to the processors wherein the NFC antenna is integrated underneath a metal chassis of the portable device, the metal chassis is constructed to include one or more slots that are perpendicular to Eddy current induced by the NFC antenna.

In an implementation, wherein the metal chassis includes an embedded or attached conductive coating, the conductive coating is located between the metal chassis and the NFC antenna.

In an implementation, wherein the one or more slots are constructed to include elongated slices that extend from the conductive coating and penetrate the metal chassis.

In an implementation, wherein the one or more slots define an area in the conductive coating, the area includes one or more grounding points to provide electrostatic discharge (ESD) protection.

In an implementation, wherein a grounding point for an area defined by the one or more slots is located at a middle of a perimeter side of the area.

In an implementation, wherein the one or more slots define an area in the conductive coating, the area covers approximate extent of electromagnetic fields that induce the Eddy current to the conductive coating.

In an implementation, wherein the one or more slots define an area in the conductive coating, the area includes a coil antenna configuration.

In an implementation, wherein the one or more slots transform the conductive coating to be a transparent conductive coating for the NFC antenna to increase NFC field strength.

In an implementation, wherein the Eddy current induced in the conductive coating includes an opposite direction to a current injected in the NFC antenna.

In an implementation, wherein the Eddy current induced in the conductive coating includes a curvature direction and the one or more slots are configured to follow the curvature direction of the Eddy current in maintaining the perpendicular configuration.

In an implementation, wherein the coil antenna is made out of a printed circuit board (PCB), a flexible printed circuit (FPC), a metal wire, created through a laser direct structuring (LDS) process, or directly embedded to the metal chassis and underneath the conductive coating.

In an implementation, a near field communications (NFC) antenna comprising: a continuous loop of coil antenna that is integrated underneath a chassis of a portable device, the chassis is constructed to include one or more slots to provide high impedance to a current that flows in perpendicular direction to the one or more slots; and an NFC module to tune the coil antenna.

In an implementation, wherein the chassis is a metal chassis that includes an embedded or attached conductive coating, the conductive coating is located between the metal chassis and the coil antenna.

In an implementation, wherein the one or more slots are constructed to include segments that extend from the conductive coating to the metal chassis.

In an implementation, wherein the current that flows in perpendicular direction to the one or more slots includes an induced Eddy current in the conductive coating.

In an implementation, wherein the one or more slots define an area in the conductive coating, the area includes one or more grounding points to provide electrostatic discharge (ESD) protection.

In an implementation, wherein a grounding point for an area defined by the one or more slots is located at a middle of a perimeter side of the area.

In an implementation, wherein the one or more slots define an area in the conductive coating, the area covers approximate extent of electromagnetic fields that induces the current that is perpendicular in direction to the one or more slots.

In an implementation, wherein the one or more slots defines an area in the conductive coating, the area includes a configuration to adopt coil antenna configuration.

In an implementation, wherein the one or more slots transform the conductive coating to be a transparent conductive coating for the coil antenna to perform NFC related functions.

In an implementation, wherein the current includes a curvature direction and the one or more slots are configured to follow the curvature direction of the current to maintain perpendicular configuration.

In an implementation, wherein the coil antenna is made out of a printed circuit board (PCB), a flexible printed circuit (FPC), a metal wire, created through a laser direct structuring (LDS) process, or directly embedded to the chassis and underneath the conductive coating.

In an implementation, a method of integrating a near field communications (NFC) antenna to a metallic chassis portable device comprising: providing one or more slots in the metallic chassis, the one or more slots are constructed to extend from the metallic chassis to a conductive coating underneath the metallic chassis; grounding at least one side of an area in the conductive coating that is defined by the one or more slots; inducing a current to the area defined by the one or more slots; providing high impedance to the induced current by configuring the one or more slots to be perpendicular in direction to the induced current.

In an implementation, wherein the induced current is an Eddy current that flows in opposite direction to an injected current injected in the NFC antenna.

In an implementation, wherein the providing the one or more slots includes construction of segments within the area in the conductive coating and extends to the metallic chassis.

In an implementation, wherein the grounding includes connecting the area to the conductive coating to maintain electrostatic discharge (ESD) protection.

In an implementation, wherein the grounding at least one side includes a grounding point that is located at a middle of a perimeter side of the area.

In an implementation, wherein the area in the conductive coating includes a configuration that adopts configuration or shape of the NFC antenna.

In an implementation, wherein the Eddy current includes a curvature direction and the one or more slots are configured to follow the curvature direction of the Eddy current to maintain perpendicular configuration.

In an implementation, further comprising radiating electromagnetic fields by the NFC antenna to create the Eddy current.

What is claimed is:

1. A device, comprising:
a metallic housing;
a processor; and
a near field communications (NFC) antenna that includes
a coil antenna mounted along a planar region of the metallic housing,
wherein the planar region includes a plurality of slots and is configured to present an impedance that reduces eddy current induced in the planar region by electromagnetic fields radiated by the NFC antenna, the induced eddy current flowing in a direction that is substantially counter to the flow of current through the coil antenna, and the reduction of the induced eddy current in the planar region enabling the coil antenna to perform NFC communications through the planar region, and wherein at least a substantial part of each one of the plurality of slots is perpendicular to a current direction of the induced eddy current.

2. The device of claim 1, wherein the planar region is formed on a portion of a conductive layer associated with the metallic housing.

3. The device of claim 2, wherein the conductive layer includes at least one grounding point configured to couple the portion of the conductive layer on which the planar region is formed to a remainder of the conductive layer.

4. The device of claim 1, wherein the planar region is substantially transparent with respect to NFC communications.

5. The device of claim 1, wherein the planar region reduces a coupling coefficient associated with the coil antenna to enable NFC communications through the planar region.

6. The device of claim 1, wherein the device comprises a handheld communications device, a mobile phone, a smartphone, a tablet, or a laptop.

7. The device of claim 1, wherein a plurality of slots are arranged in a pattern that radiate outward from a substantially rectangular region.

8. A device, comprising:
 a metal chassis that forms at least a majority of an exterior surface of the device;
 a processor mounted within the metal chassis; and
 an NFC antenna that includes a coil antenna mounted along a planar region of the metal chassis,
 wherein the planar region includes a plurality of slots and is configured to present an impedance that reduces eddy current induced in the planar region by electromagnetic fields radiated by the NFC antenna, the induced eddy current flowing in a direction that is substantially counter to the flow of current through the coil antenna, and the reduction of the induced eddy current in the planar region enabling the coil antenna to perform NFC communications through the planar region, and
 wherein at least a substantial part of each one of the plurality of slots is perpendicular to a current direction of the induced eddy current.

9. The device of claim 8, wherein the planar region is formed on a portion of a conductive layer associated with the metallic housing.

10. The device of claim 9, wherein the conductive layer includes at least one grounding point configured to couple the portion of the conductive layer on which the planar region is formed to a remainder of the conductive layer.

11. The device of claim 8, wherein the planar region is substantially transparent with respect to NFC communications.

12. The device of claim 8, wherein the planar region reduces a coupling coefficient associated with the coil antenna to enable NFC communications through the planar region.

13. The device of claim 8, wherein the device comprises a handheld communications device, a mobile phone, a smartphone, a tablet, or a laptop.

14. The device of claim 8, wherein a plurality of slots are arranged in a pattern that radiate outward from a substantially rectangular region.

15. A mobile device, comprising:
 a metallic housing;
 a processor mounted in the metallic housing; and
 an NFC antenna that further includes a coil antenna mounted within a planar region associated with the metallic housing,
 wherein the planar region includes a plurality of slots and is configured to present an impedance that reduces eddy current induced in the planar region by electromagnetic fields radiated by the NFC antenna, the induced eddy current flowing in a direction that is substantially counter to the flow of current through the coil antenna, and the reduction of the induced eddy current in the planar region enabling the coil antenna to perform NFC communications through the planar region, and
 wherein at least a substantial part of each one of the plurality of slots is perpendicular to a current direction of the induced eddy current.

16. The mobile device of claim 15, wherein the planar region is formed on a portion of a conductive layer associated with the metallic housing.

17. The mobile device of claim 16, wherein the conductive layer includes at least one grounding point configured to couple the portion of the conductive layer on which the planar region is formed to a remainder of the conductive layer.

18. The mobile device of claim 15, wherein the planar region is substantially transparent with respect to NFC communications.

19. The mobile device of claim 15, wherein the planar region reduces a coupling coefficient associated with the coil antenna to enable NFC communications through the planar region.

20. The mobile device of claim 15, wherein a plurality of slots are arranged in a pattern that radiate outward from a substantially rectangular region.

* * * * *